(12) United States Patent
Eo et al.

(10) Patent No.: US 10,416,489 B2
(45) Date of Patent: Sep. 17, 2019

(54) POLYMER DISPERSED LIQUID CRYSTAL FILM FOR VEHICLES AND A VEHICLE INCLUDING THE SAME

(71) Applicants: HYUNDAI MOTOR COMPANY, Seoul (KR); KIA MOTORS CORPORATION, Seoul (KR); LIVICON, Chungju-si, Chungcheongbuk-do (KR)

(72) Inventors: Moon Jung Eo, Suwon-si (KR); Hee Young Yun, Gwangju-si (KR)

(73) Assignees: Hyundai Motor Company, Seoul (KR); Kia Motors Corporation, Seoul (KR); LIVICON, Shungju-si, Chungcheongbuk-do (KR)

( * ) Notice: Subject to any disclaimer, the term of this patent is extended or adjusted under 35 U.S.C. 154(b) by 11 days.

(21) Appl. No.: 15/857,364

(22) Filed: Dec. 28, 2017

(65) Prior Publication Data

US 2019/0107744 A1    Apr. 11, 2019

(30) Foreign Application Priority Data

Oct. 11, 2017    (KR) .................. 10-2017-0129869

(51) Int. Cl.

| | | |
|---|---|---|
| C01G 15/00 | (2006.01) | |
| C01G 19/02 | (2006.01) | |
| C09K 19/54 | (2006.01) | |
| G02F 1/1334 | (2006.01) | |

(52) U.S. Cl.
CPC .......... *G02F 1/1334* (2013.01); *C09K 19/544* (2013.01); *C01G 15/00* (2013.01); *C01G 19/02* (2013.01); *C08L 2203/16* (2013.01)

(58) Field of Classification Search
None
See application file for complete search history.

(56) References Cited

U.S. PATENT DOCUMENTS

| | | | | |
|---|---|---|---|---|
| 5,828,432 A | * | 10/1998 | Shashidhar | ......... G02F 1/13439 349/139 |
| 5,844,644 A | * | 12/1998 | Oh | .................... G02F 1/133526 349/95 |
| 6,429,914 B1 | * | 8/2002 | Kubota | .................. G02F 1/1334 349/141 |
| 7,303,809 B2 | * | 12/2007 | Choi | .................... G02F 1/13439 349/147 |
| 2010/0302488 A1 | * | 12/2010 | Asaoka | .................. G02F 1/1334 349/123 |

(Continued)

FOREIGN PATENT DOCUMENTS

KR    10-2009-0098886 A    9/2009

*Primary Examiner* — Edward J Glick
*Assistant Examiner* — David Y Chung
(74) *Attorney, Agent, or Firm* — Morgan, Lewis & Bockius LLP

(57) ABSTRACT

A polymer dispersed liquid crystal film for vehicles includes an electrode unit, a first electrode provided on the electrode unit, a polymer layer provided between the electrode unit and the first electrode, and a plurality of liquid crystal molecules dispersed in the polymer layer. The electrode unit includes a resin layer and a mesh-type second electrode inserted into the resin layer. The upper surface of the second electrode is exposed to the outside of the resin layer.

8 Claims, 10 Drawing Sheets

(56) References Cited

U.S. PATENT DOCUMENTS

2012/0162550 A1* 6/2012 Jeong ................ G02F 1/134309
                                                        349/15
2013/0329167 A1* 12/2013 Iwanami ............... G02F 1/1334
                                                        349/86

* cited by examiner

[FIG. 1]
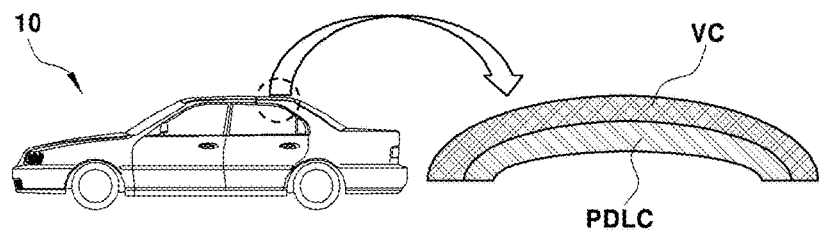
[FIG. 2A]
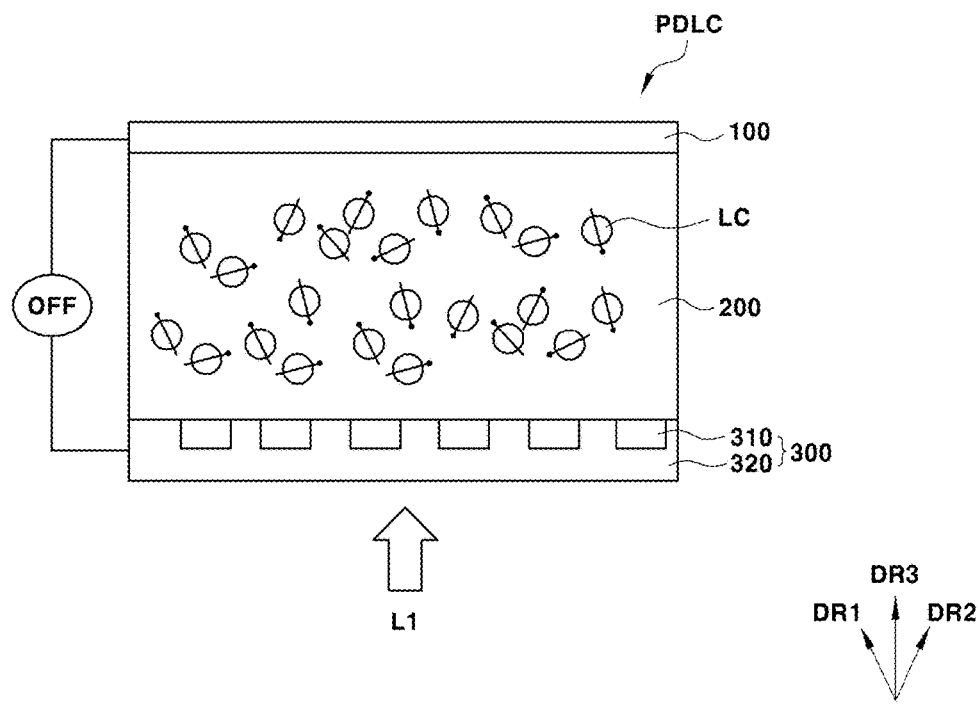

[FIG. 2B]
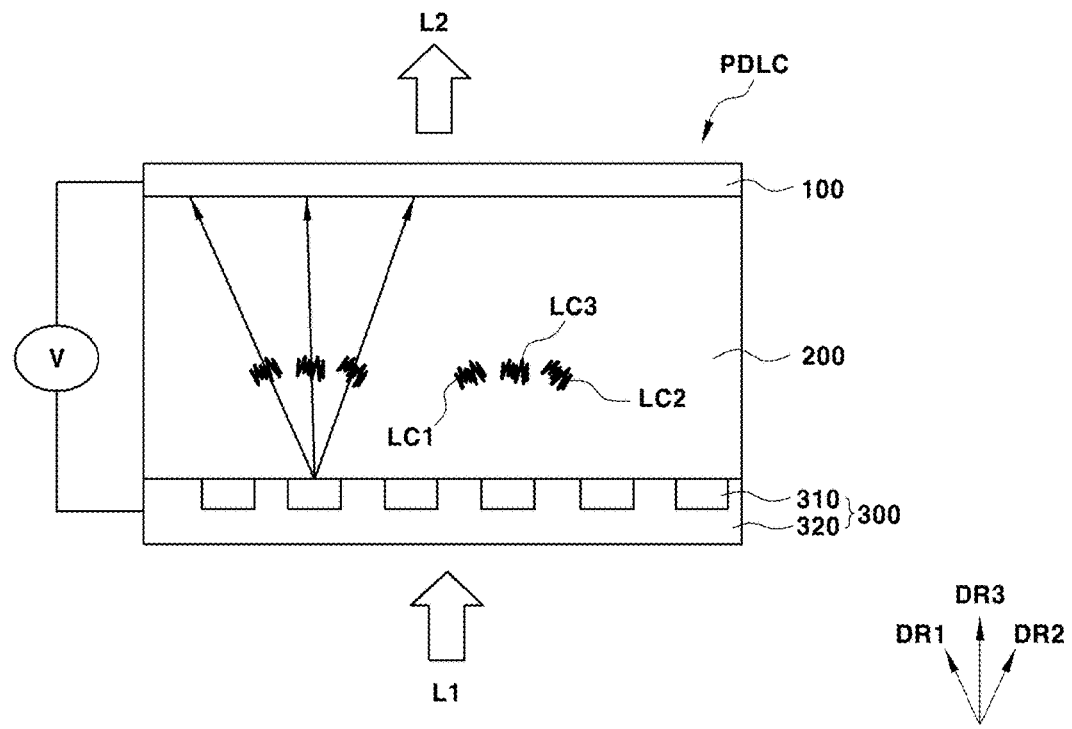
[FIG. 3]
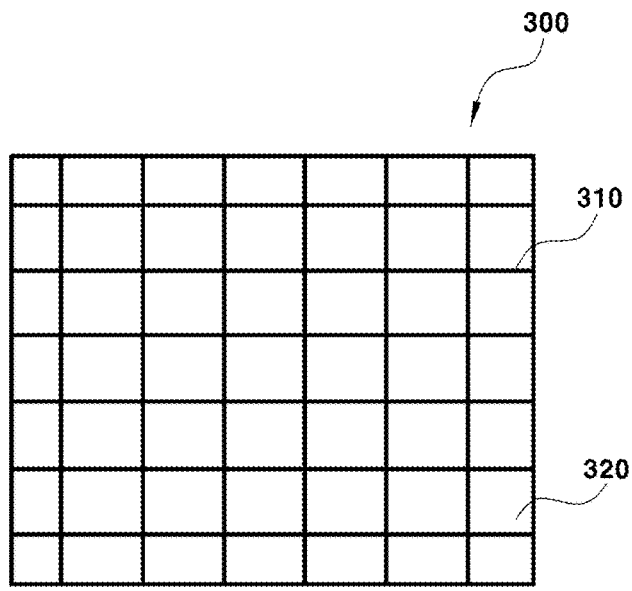

[FIG. 4A]
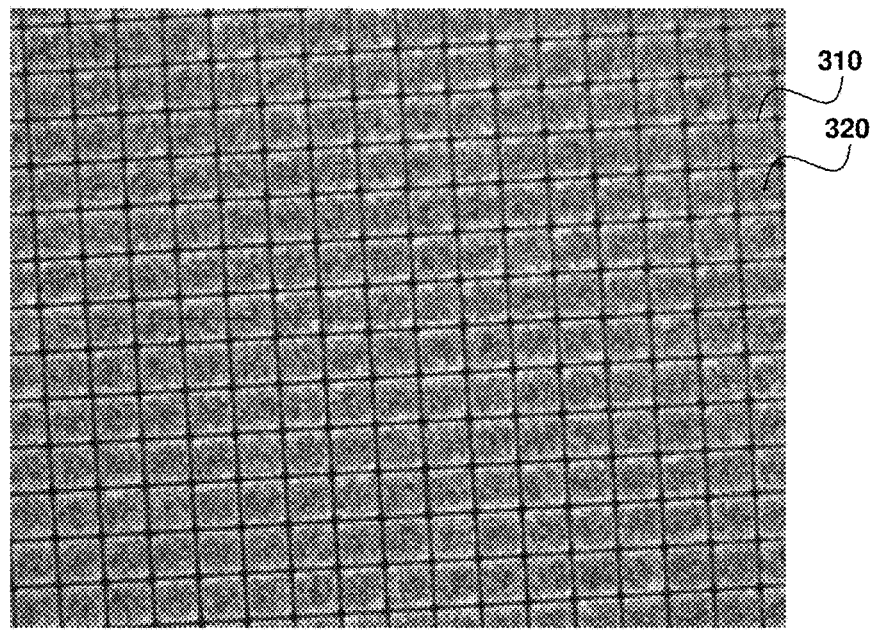
[FIG. 4B]
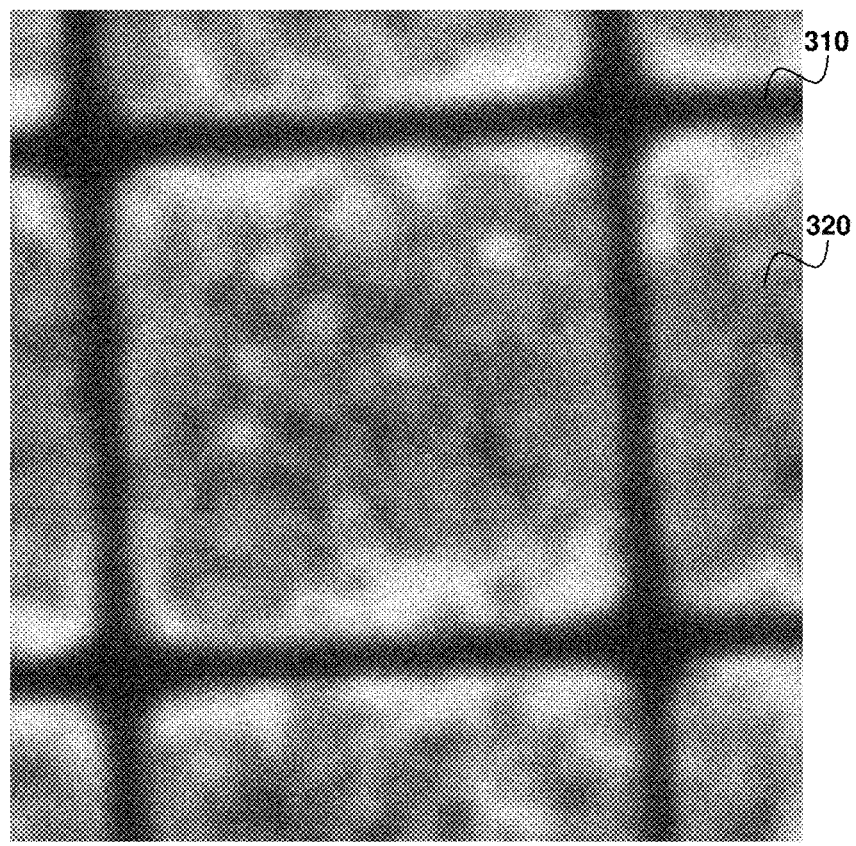

[FIG. 5A]
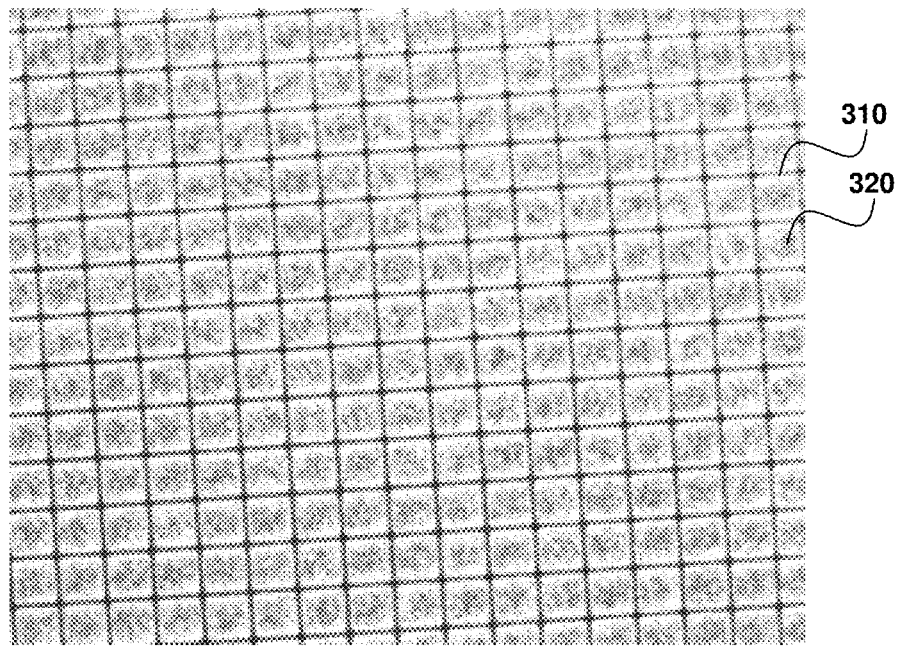
[FIG. 5B]
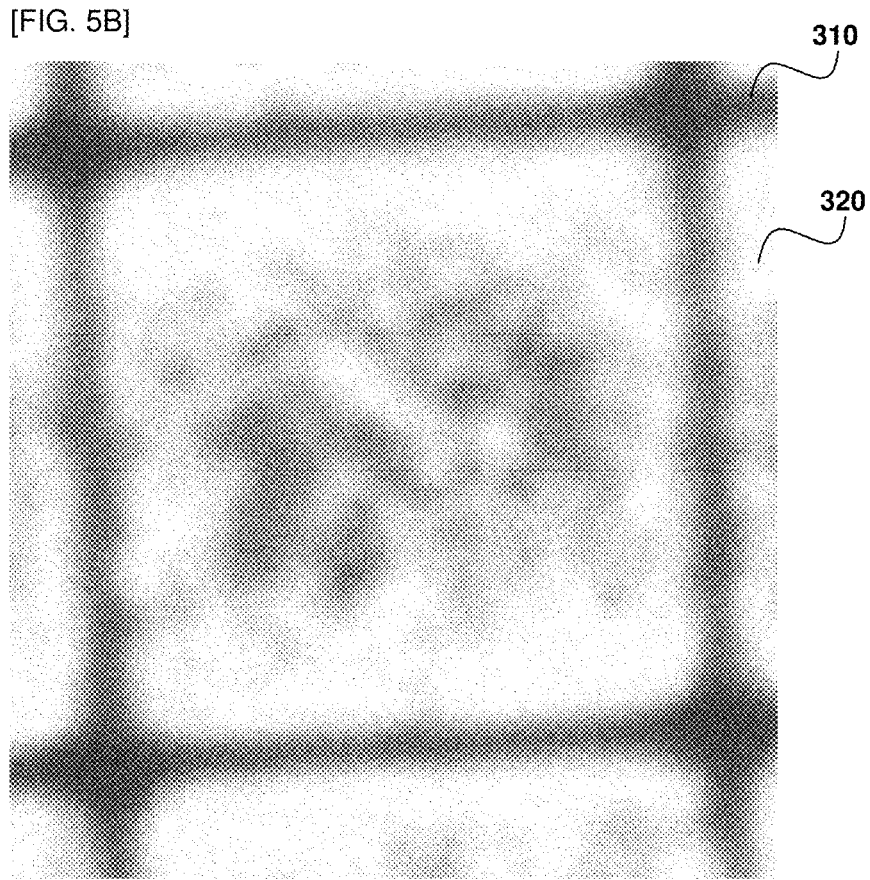

[FIG. 6A]
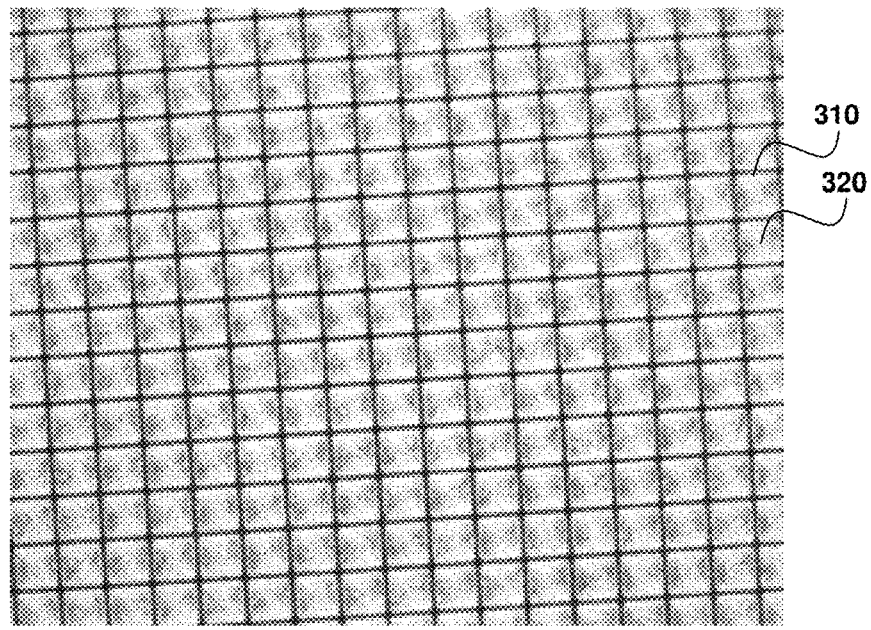
[FIG. 6B]
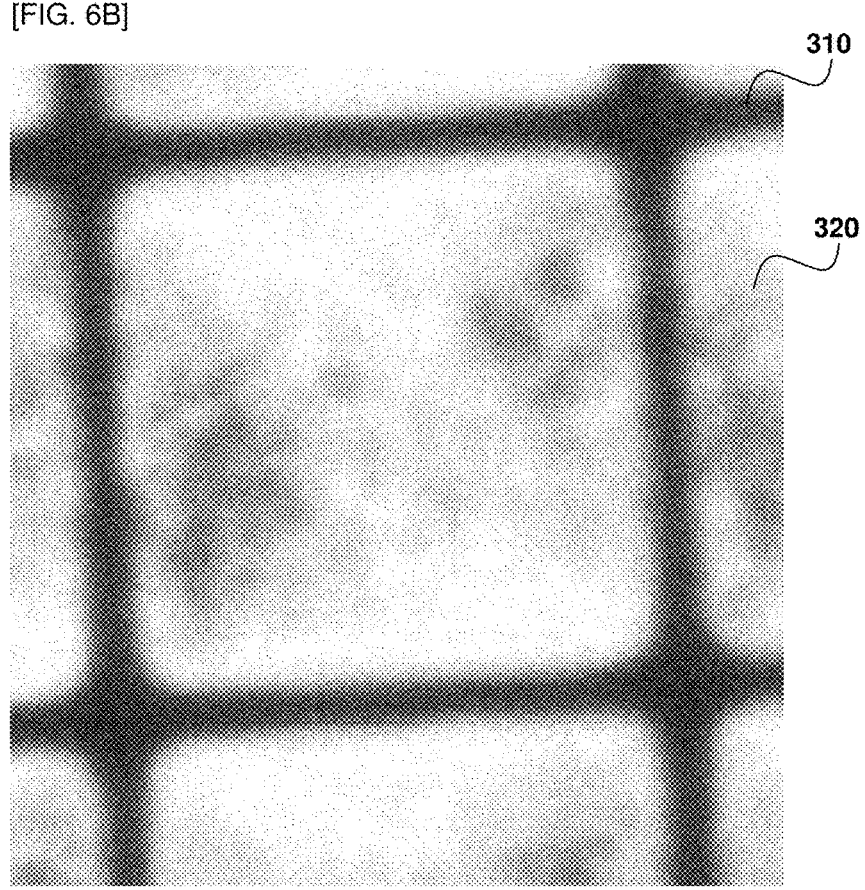

[FIG. 7A]
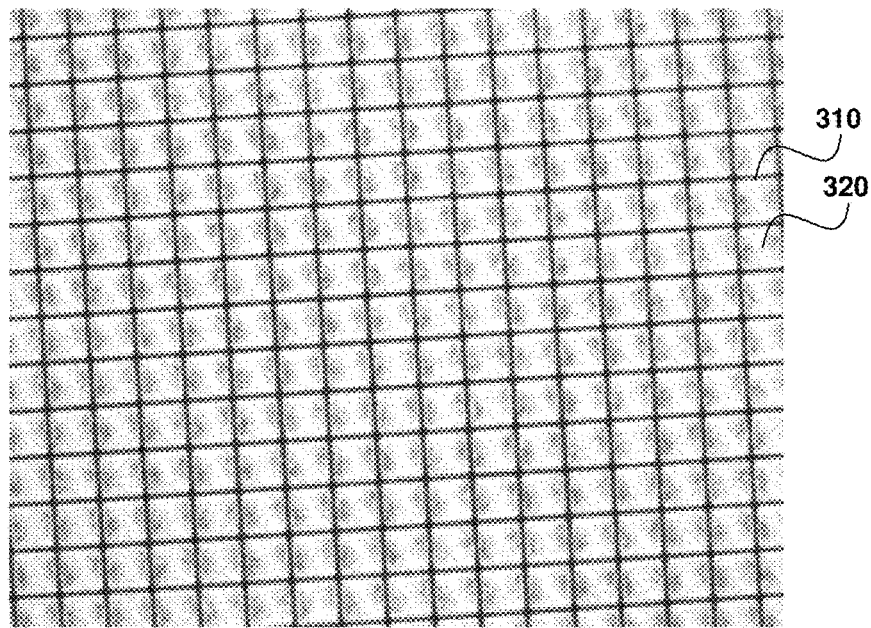
[FIG. 7B]
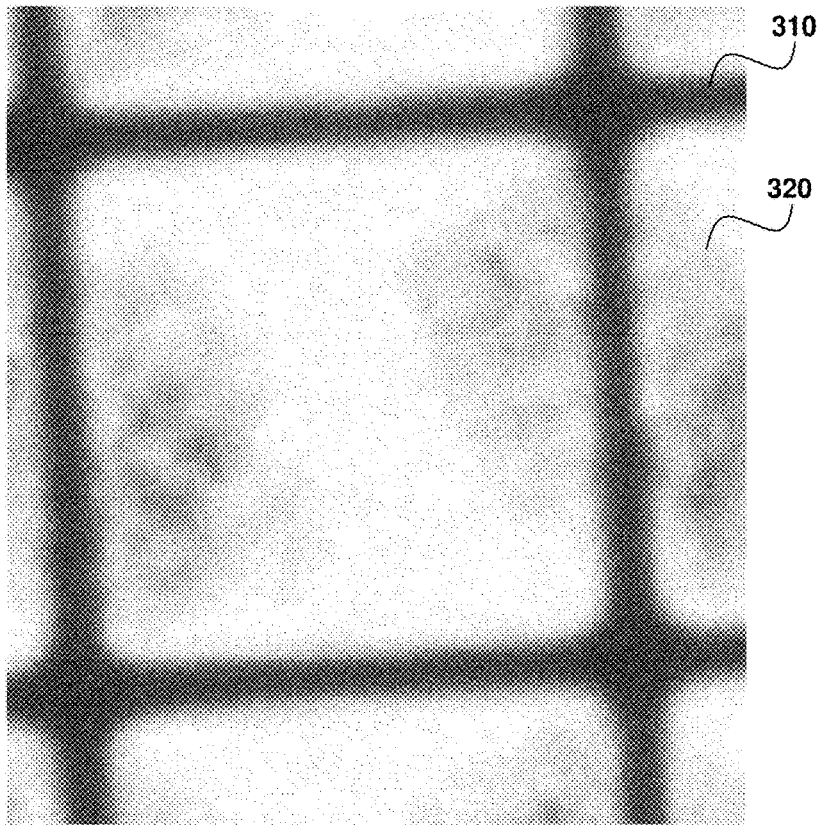

[FIG. 8A]
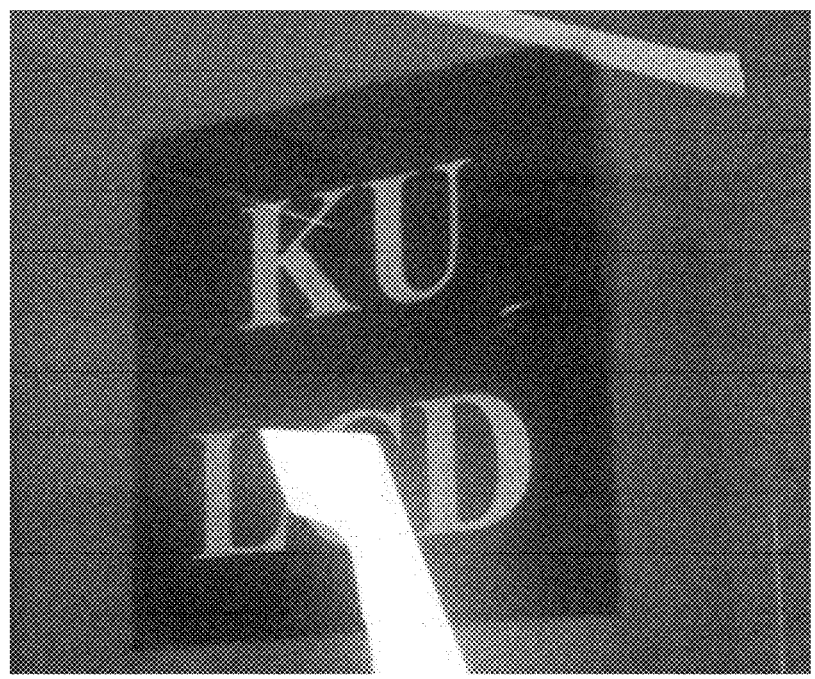

[FIG. 8B]

[FIG. 9A]
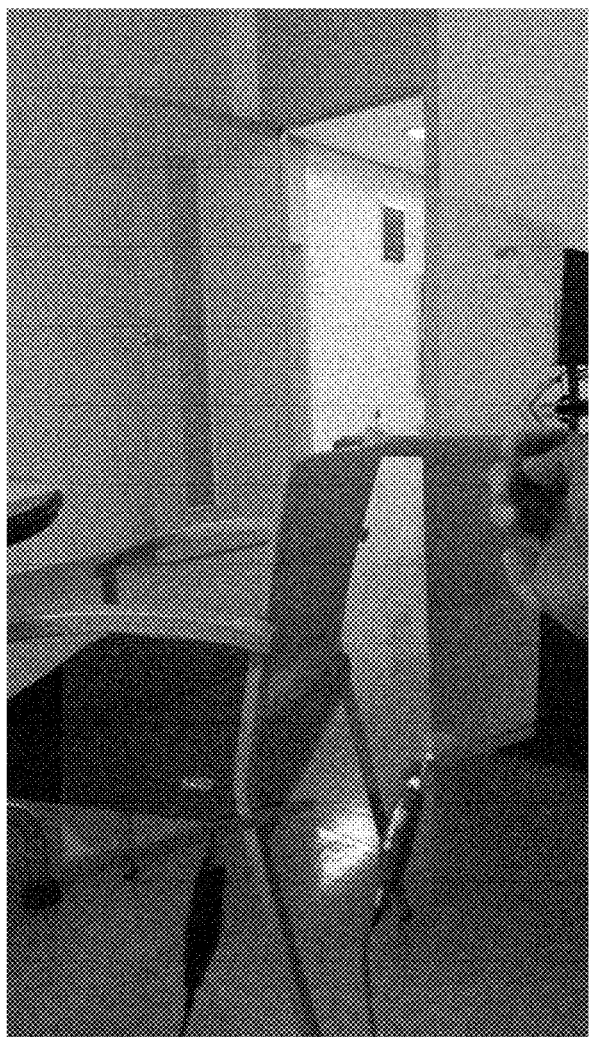

[FIG. 9B]
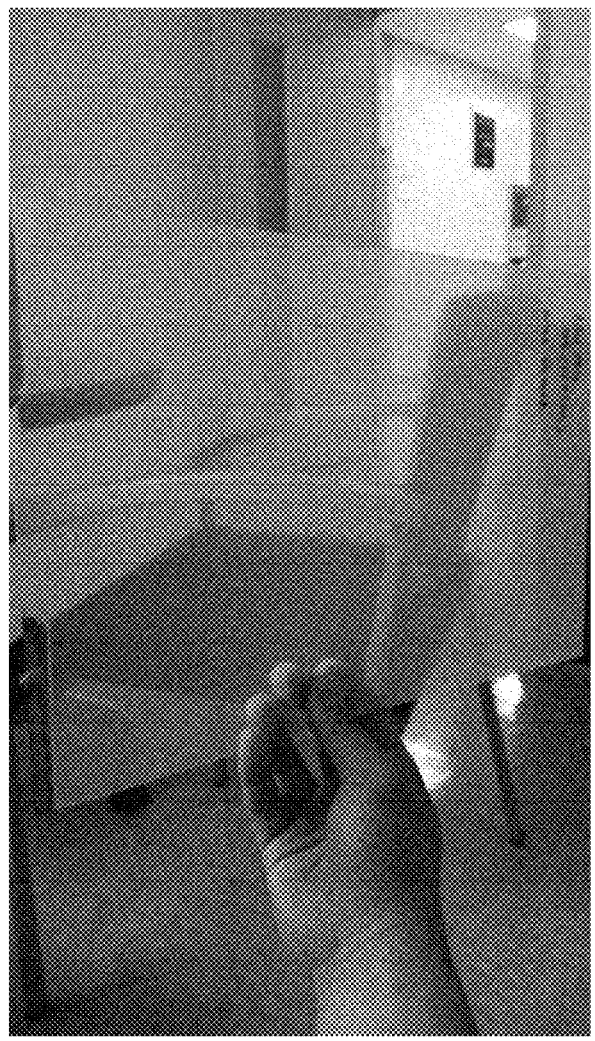

POLYMER DISPERSED LIQUID CRYSTAL FILM FOR VEHICLES AND A VEHICLE INCLUDING THE SAME

CROSS-REFERENCE TO RELATED APPLICATION

This application claims under 35 U.S.C. § 119(a) the benefit of priority to Korean Patent Application No. 10-2017-0129869 filed on Oct. 11, 2017, the entire contents of which are incorporated herein by reference.

BACKGROUND

(a) Technical Field

The present disclosure relates to a polymer dispersed liquid crystal film for vehicles and a vehicle including the same. More particularly, it relates to a polymer dispersed liquid crystal film for vehicles which may improve a viewing angle, and a vehicle including the same.

(b) Background Art

Recently, as vehicles are diversified, cases that display devices are disposed in vehicles so as to recognize an image are increasing. Further, a demand for a polymer dispersed liquid crystal film in which a separate light emitting member is omitted is also increasing. However, a large number of curved members is disposed in a vehicle and, if such a polymer dispersed liquid crystal film is disposed on the curved member, a recognition degree of an image may be varied according to positions of a user.

SUMMARY OF THE DISCLOSURE

The present disclosure has been made in an effort to solve the above-described problems associated with the prior art and it is an object of the present disclosure to provide a polymer dispersed liquid crystal film for vehicles which may improve a viewing angle.

It is another object of the present disclosure to provide a vehicle including a polymer dispersed liquid crystal film for vehicles which may improve a viewing angle.

In one aspect, the present disclosure provides a polymer dispersed liquid crystal film for vehicles, including an electrode unit, a first electrode provided on the electrode unit, a polymer layer provided between the electrode unit and the first electrode, and a plurality of liquid crystal molecules dispersed in the polymer layer, wherein the electrode unit includes a resin layer and a mesh-type second electrode inserted into the resin layer, and the upper surface of the second electrode is exposed to the outside of the resin layer.

In a preferred embodiment, the lower surface of the second electrode may be disposed within the resin layer.

In another preferred embodiment, when voltage is applied between the first electrode and the second electrode, the liquid crystal molecules may be arranged in directions from the first electrode toward the second electrode and transmit light, provided from a region below the polymer dispersed liquid crystal film for vehicles, to a region above the polymer dispersed liquid crystal film for vehicles.

In still another preferred embodiment, the liquid crystal molecules may include first liquid crystal molecules arranged in a first direction when voltage is applied between the first electrode and the second electrode, second liquid crystal molecules arranged in a second direction intersecting with the first direction when voltage is applied between the first electrode and the second electrode, and third liquid crystal molecules arranged in a thickness direction of the polymer dispersed liquid crystal film for vehicles intersecting with the first direction and the second direction when voltage is applied between the first electrode and the second electrode.

In yet another preferred embodiment, the electrode unit may further include a base layer provided under the resin layer and a hard coating layer provided under the base layer.

In still yet another preferred embodiment, the electrode may include at least one of indium tin oxide (ITO), indium zinc oxide (IZO), zinc oxide (ZnO) and indium tin zinc oxide (ITZO).

In a further preferred embodiment, the second electrode may include at least one of Ag, Mg, Cu, Al, Pt, Pd, Au, Ni, Nd, Ir, Cr, Li, Ca, Mo and Ti.

In another aspect, the present disclosure provides a vehicle including a curved member and a polymer dispersed liquid crystal film for vehicles. The polymer dispersed liquid crystal film for vehicles is provided on the curved member. The polymer dispersed liquid crystal film for vehicles includes an electrode unit, a first electrode provided on the electrode unit, a polymer layer provided between the electrode unit and the first electrode, and a plurality of liquid crystal molecules dispersed in the polymer layer. The electrode unit includes a resin layer and a mesh-type second electrode inserted into the resin layer. The upper surface of the second electrode is exposed to the outside of the resin layer.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 shows a view schematically illustrating a vehicle in accordance with one embodiment of the present disclosure;

FIG. 2A shows a cross-sectional view of a polymer dispersed liquid crystal film for vehicles in accordance with one embodiment of the present disclosure in a state in which voltage is not applied thereto;

FIG. 2B shows a cross-sectional view of the polymer dispersed liquid crystal film for vehicles in a state in which voltage is applied thereto;

FIG. 3 shows a plan view schematically illustrating an electrode unit included in the polymer dispersed liquid crystal film for vehicles;

FIGS. 4A and 4B show photographs of a polymer dispersed liquid crystal film for vehicles of Test example 1 taken from above, when voltage of 17V is applied thereto;

FIGS. 5A and 5B show photographs of the polymer dispersed liquid crystal film for vehicles of Test example 1 taken from above, when voltage of 22V is applied thereto;

FIGS. 6A and 6B show photographs of the polymer dispersed liquid crystal film for vehicles of Test example 1 taken from above, when voltage of 50V is applied thereto;

FIGS. 7A and 7B show photographs of the polymer dispersed liquid crystal film for vehicles of Test example 1 taken from above, when voltage of 80V is applied thereto;

FIG. 8A shows a photograph of the polymer dispersed liquid crystal film for vehicles of Test example 1 which is bent into a curved shape, through which a recognition degree of an object is confirmed when voltage is applied thereto;

FIG. 8B shows a photograph of the polymer dispersed liquid crystal film for vehicles of Test example 1 which is bent into the curved shape, through which a recognition degree of an object is confirmed when voltage is not applied thereto;

FIG. 9A shows a photograph of the polymer dispersed liquid crystal film for vehicles of Test example 1, through which a recognition degree of an object at an angle of 45 degrees is confirmed by applying voltage thereto; and FIG. 9B shows a photograph of a polymer dispersed liquid crystal film for vehicles of Comparative example 1, through which a recognition degree of an object at an angle of 45 degrees is confirmed by applying voltage thereto.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims.

In the drawings, the same or similar elements are denoted by the same reference numerals even though they are depicted in different drawings. In the drawings, in order to more clearly describe the present disclosure, sizes of structures are exaggerated. Further, terms "first", "second", etc. may be used to describe various elements, but the elements are not limited by the terms. These terms are used only to discriminate one element from other elements. For example, a first element may be named a second element without departing from the scope and spirit of the disclosure and, similarly, a second element may be named a first element. Singular expressions may encompass plural expressions, unless stated otherwise.

In the following description of the embodiments, terms "including" and "having" will be interpreted as indicating presence of characteristics, numbers, steps, operations, elements, parts stated in the specification or combinations thereof, and do not exclude presence of one or more other characteristics, numbers, steps, operations elements or combinations thereof, or possibility of adding the same. In addition, it will be understood that, when a part, such as a layer, a film, a region or a plate, is "on" another part, the part may be located "directly on" the other part or other parts may be interposed between both parts. In the same manner, it will be understood that, when a part, such as a layer, a film, a region or a plate, is "under" another part, the part may be located "directly under" the other part or other parts may be interposed between both parts.

Hereinafter, a polymer dispersed liquid crystal film for vehicles and a vehicle including the same will be described FIG. 1 shows a view schematically illustrating a vehicle including a polymer dispersed liquid crystal film for vehicles in accordance with one embodiment of the present disclosure. A vehicle 10 may imply a transportation means used to transport people, things, etc. Transportation means include overland transportation means, marine transportation means and air transportation means. Overland transportation may include, for example, automobiles including cars, vans, trucks, trailer trucks, sports cars, etc., bicycles, motorcycles, trains, etc. Marine transportation means may include, for example, ships, submarines, etc. Air transportation means may include, for example, airplanes, hang gliders, hot-air balloon, helicopters, small aerial vehicles, such as drones, etc.

A vehicle 10 in accordance with one embodiment of the present disclosure includes a curved member VC and a polymer dispersed liquid crystal film for vehicles PDLC. The polymer dispersed liquid crystal film for vehicles PDLC may be provided on the curved member VC. The curved member VC may be a body part or a window of the vehicle 10. The body part of the vehicle 10 may be, for example, a roof, a back mirror or a side mirror of the vehicle 10. The window may include, for example, a chassis of the vehicle 10.

FIG. 2A shows a cross-sectional view of a polymer dispersed liquid crystal film for vehicles in accordance with one embodiment of the present disclosure in a state in which voltage is not applied thereto, and FIG. 2B is a cross-sectional view of the polymer dispersed liquid crystal film for vehicles in a state in which voltage is applied thereto.

With reference to FIGS. 2A and 2B, a polymer dispersed liquid crystal film for vehicles PDLC in accordance with one embodiment of the present disclosure includes a first electrode 100, a polymer layer 200, a plurality of liquid crystal molecules LC, and an electrode unit 300.

The first electrode 100 may be, for example, an anode. The first electrode 100 may include a single layer. The first electrode 100 has a platy shape without any hole.

The first electrode 100 may be transparent. Here, the term "transparent" may mean transmission of 90% or more of received light. Although any material which is conventionally used may be used as the first electrode 100 without limitation, the first electrode 100 may include, for example, at least one of indium tin oxide (ITO), indium zinc oxide (IZO), zinc oxide (ZnO) and indium tin zinc oxide (ITZO). Although not shown in the drawings, a resin layer may be provided on the first electrode 100.

The polymer layer 200 may be provided between the first electrode 100 and the electrode unit 300. The polymer layer 200 may be formed of, for example, aliphatic urethane acrylate compounds.

The liquid crystal molecules LC are dispersed in the polymer layer 200. With reference to FIG. 2A, the liquid crystal molecules LC do not have specific orientation and are arranged randomly when voltage is not applied between the first electrode 100 and a second electrode 310. Therefore, the polymer dispersed liquid crystal film for vehicles PDLC does not transmit light L1 provided from a region below the electrode unit 300 but scatters light L1.

With reference to FIG. 2B, when voltage is applied between the first electrode 100 and the second electrode 310 (arrows in the polymer layer 200), the liquid crystal molecules LC are arranged in directions from the first electrode 100 toward the second electrode 310 and transmit light L1, provided from the region below the polymer dispersed liquid crystal film for vehicles PDLC, to a region above the polymer dispersed liquid crystal film for vehicles PDLC, and, thus, a user may recognize transmitted light L2.

When voltage is applied between the first electrode 100 and the second electrode 310, the liquid crystal molecules LC are arranged in current flow directions from the second electrode 310 to the first electrode 100. For example, the liquid crystal molecules LC are arranged in a first direction DR1, a second direction DR2 and a third direction DR3. The liquid crystal molecules LC may include first liquid crystal molecules LC1 arranged in the first direction DR1, second liquid crystal molecules LC2 arranged in the second direction DR2, and third liquid crystal molecules LC3 arranged in the third direction DR3, i.e. a thickness direction of the polymer dispersed liquid crystal film for vehicles PDLC intersecting with the first direction DR1 and the second direction DR2, when voltage is applied between the first electrode 100 and the second electrode 310.

FIG. 3 shows a plan view schematically illustrating the electrode unit 300 of the polymer dispersed liquid crystal film for vehicles PDLC.

With reference to FIGS. 2A, 2B and 3, the electrode unit 300 includes a resin layer 320 and the second electrode 310. The resin layer 320 may be formed of, for example, polyurethane or polystyrene.

The second electrode 310 is inserted into the resin layer 320. The upper surface of the second electrode 310 is exposed to the outside of the resin layer 320. The upper surface of the resin layer 320 and the upper surface of the second electrode 310 may form one straight line in a sectional view. The lower surface of the second electrode 310 may be disposed within the resin layer 320. The lower surface of the second electrode 310 does not coincide with the lower surface of the resin layer 320 and is spaced apart from the lower surface of the resin layer 320. For example, the lower surface of the second electrode 310 may be spaced apart from the lower surface of the resin layer 320 in the thickness direction.

The second electrode 310 may be formed as a mesh. The mesh may be defined by a plurality of first branch parts arranged to be spaced apart from each other in the row direction and a plurality of second branch parts arranged to be spaced apart from each other in the column direction. Although FIG. 3 illustrates the first branch parts and the second branch parts as being spaced apart from each other by the same interval, the present disclosure is not limited thereto, and at least one of intervals between the first branch parts and at least one of intervals between the second branch parts may be different from other intervals.

Although not shown in the drawings, the electrode unit 300 may further include a base layer and a hard coating layer. The base layer is provided under the resin layer 320. The base layer may include polyethylene terephthalate (PET), polycarbonate, polyimide, etc. The base layer may improve durability of the base unit 300.

The hard coating layer is provided under the base layer. The hard coating layer may include a metal oxide, such as $SiO_2$ or $TiO_2$. The hard coating layer protects the second electrode 310 from external impact and prevents moisture penetration, thus improving durability of the polymer dispersed liquid crystal film for vehicles PDLC.

The second electrode 310 may include a metal. For example, the second electrode 310 may include at least one of Ag, Mg, Cu, Al, Pt, Pd, Au, Ni, Nd, Ir, Cr, Li, Ca, Mo and Ti.

In a conventional polymer dispersed liquid crystal film for vehicles, a second electrode includes no pattern and has a platy shape and, thus, liquid crystal molecules are arranged only in the thickness direction of the polymer dispersed liquid crystal film for vehicles even if voltage is applied between a first electrode and the second electrode. Therefore, a recognition degree of an image or light passed through the conventional polymer dispersed liquid crystal film for vehicles is varied according to positions of a user.

On the other hand, a polymer dispersed liquid crystal film for vehicles in accordance with one embodiment of the present disclosure includes a mesh-type second electrode formed by patterning and, thus, liquid crystal molecules may be arranged in oblique directions intersecting the thickness direction and, even if the polymer dispersed liquid crystal film for vehicles is used on a curved surface or if the position of a user is changed, a recognition degree of an image or light passed through the polymer dispersed liquid crystal film for vehicles may be maintained. That is, the polymer dispersed liquid crystal film for vehicles in accordance with one embodiment of the present disclosure may improve a viewing angle.

Hereinafter, the present disclosure will be described in more detail through the following Test example. It will be understood that the Test example is given only to more easily describe the present disclosure and is not intended to limit the scope and spirit of the disclosure.

Test Example 1

A polymer dispersed liquid crystal film for vehicles, including a first electrode formed of ITO and having a thickness of 188 μm and a mesh-type second electrode formed of Ag and having a thickness of 150 to 220 μm and intervals of 100 μm between rows and columns, was manufactured.

Comparative Example 1

A polymer dispersed liquid crystal film for vehicles having the same configuration as the polymer dispersed liquid crystal film for vehicles of Test example 1, except that a second electrode is not mesh-type but has the same shape as a first electrode, was manufactured.

Confirmation of Arrangement of Liquid Crystal Molecules

FIGS. 4A, 4B, 5A, 5B, 6A, 6B, 7A and 7B are photographs of the polymer dispersed liquid crystal film for vehicles of Test example 1 taken from above, when voltages of 17V, 22V, 50V and 80V are respectively applied thereto, illustrating arrangement states of liquid crystal molecules. It may be confirmed that, as voltage applied to the polymer dispersed liquid crystal film for vehicles is increased, the liquid crystal molecules are vertically arranged starting from the periphery of the mesh-type second electrode.

Confirmation of Viewing Angle of PDLC of Test Example 1

A recognition degree of an object was confirmed by applying voltage to the polymer dispersed liquid crystal film for vehicles of Test example 1, which is bent in a curved shape. With reference to FIGS. 8A and 8B, it may be confirmed that, when voltage is applied to the polymer dispersed liquid crystal film for vehicles of Test example 1, the object is clearly recognized even if the polymer dispersed liquid crystal film for vehicles of Test example 1 is bent.

Confirmation of Viewing Angle

In order to confirm viewing angles of the polymer dispersed liquid crystal film for vehicles of Test example 1 and the polymer dispersed liquid crystal film for vehicles of Comparative example 1, voltage was applied to the polymer dispersed liquid crystal films for vehicles of Test example 1 and Comparative example 1, and then transmittances of the polymer dispersed liquid crystal films for vehicles of Test example 1 and Comparative example 1 at an angle of 45 degrees were checked. With reference to FIGS. 9A and 9B, it may be confirmed that viewing angle properties of the polymer dispersed liquid crystal film for vehicles of Test example 1 are improved, as compared to the polymer dispersed liquid crystal film for vehicles of Comparative example 1.

As is apparent from the above description, a polymer dispersed liquid crystal film for vehicles in accordance with one embodiment of the present disclosure may improve a viewing angle.

Further, a polymer dispersed liquid crystal film for vehicles included in a vehicle in accordance with one embodiment of the present disclosure may improve a viewing angle.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A polymer dispersed liquid crystal film for vehicles, comprising:
    an electrode unit;
    a first electrode provided on the electrode unit;
    a polymer layer provided between the electrode unit and the first electrode; and
    a plurality of liquid crystal molecules dispersed in the polymer layer,
    wherein the electrode unit includes:
        a resin layer; and
        a mesh-type second electrode inserted into the resin layer,
    wherein an upper surface of the second electrode is exposed to outside of the resin layer, and
    wherein the plurality of liquid crystal molecules include:
        first liquid crystal molecules arranged in a first direction, when a voltage is applied between the first electrode and the second electrode;
        second liquid crystal molecules arranged in a second direction intersecting the first direction when the voltage is applied between the first electrode and the second electrode; and
        third liquid crystal molecules arranged in a thickness direction of the polymer dispersed liquid crystal film for vehicles, when the voltage is applied between the first electrode and the second electrode, the thickness direction intersecting with the first direction and the second direction.

2. The polymer dispersed liquid crystal film for vehicles of claim 1, wherein a lower surface of the second electrode is disposed within the resin layer.

3. The polymer dispersed liquid crystal film for vehicles of claim 1, wherein, when the voltage is applied between the first electrode and the second electrode, the plurality of liquid crystal molecules are arranged in directions from the first electrode toward the second electrode and transmit light provided from a region below the polymer dispersed liquid crystal film for vehicles to a region above the polymer dispersed liquid crystal film for vehicles.

4. The polymer dispersed liquid crystal film for vehicles of claim 1, wherein the electrode unit further includes:
    a base layer provided under the resin layer; and
    a hard coating layer provided under the base layer.

5. The polymer dispersed liquid crystal film for vehicles of claim 1, wherein the first electrode includes at least one of indium tin oxide (ITO), indium zinc oxide (IZO), zinc oxide (ZnO) and indium tin zinc oxide (ITZO).

6. The polymer dispersed liquid crystal film for vehicles of claim 1, wherein the second electrode includes at least one of Ag, Mg, Cu, Al, Pt, Pd, Au, Ni, Nd, Ir, Cr, Li, Ca, Mo and Ti.

7. A vehicle comprising:
    a curved member; and
    the polymer dispersed liquid crystal film for vehicles of claim 1, provided on the curved member.

8. The vehicle of claim 7, wherein the curved member is a body part or a window of the vehicle.

* * * * *